United States Patent [19]
Kim

[11] Patent Number: 5,738,076
[45] Date of Patent: Apr. 14, 1998

[54] COMPRESSED NATURAL GAS ENGINE

[75] Inventor: Jong Woo Kim, Seoul, Rep. of Korea

[73] Assignee: Daewoo Motor Co., Ltd., Inchon, Rep. of Korea

[21] Appl. No.: 666,422

[22] PCT Filed: Sep. 27, 1995

[86] PCT No.: PCT/KR95/00128

§ 371 Date: Jun. 13, 1996

§ 102(e) Date: Jun. 13, 1996

[87] PCT Pub. No.: WO96/12102

PCT Pub. Date: Apr. 25, 1996

[30] Foreign Application Priority Data

Oct. 15, 1994 [KR] Rep. of Korea ............... 1994/26438

[51] Int. Cl.$^6$ .................................................... F02M 21/00
[52] U.S. Cl. .................................................... 123/527
[58] Field of Search ......................... 123/472, 525, 123/526, 527, 27 GE

[56] References Cited

U.S. PATENT DOCUMENTS

| | | | |
|---|---|---|---|
| 3,651,794 | 3/1972 | Douglas | 123/120 |
| 4,831,993 | 5/1989 | Kelgard | 125/525 |
| 5,150,691 | 9/1992 | Imajo | 123/472 |
| 5,325,838 | 7/1994 | Bennett | 123/527 |
| 5,367,999 | 11/1994 | King et al. | 123/527 |
| 5,522,369 | 6/1996 | Povinger | 123/527 |

FOREIGN PATENT DOCUMENTS

| | | | |
|---|---|---|---|
| 176334 | 10/1982 | Japan | 123/525 |
| 51544 | 1/1993 | Japan | 123/527 |
| 6123248 | 5/1994 | Japan | 123/525 |
| 8600611 | 10/1987 | Netherlands | 123/527 |
| 1456624 | 2/1989 | U.S.S.R. | 123/527 |

*Primary Examiner*—Erick R. Solis
*Attorney, Agent, or Firm*—Darby & Darby

[57] ABSTRACT

A compressed natural gas flow generating apparatus comprising: one or more gas supplies (62); a pressure controller (65) for controlling the pressure of gas injected by the gas supply (62); a fuel rail (68) for providing gas for the engine (20) from said pressure controller (65), the fuel rail (68) including a plurality of gas injectors (I1, I2, I3, I4) injecting gas and a plurality of gas injection tubes (23) coupled with the gas injectors (I1, I2, I3, I4), the gas injection tube (23) fixed to the inner wall (24a) of the intake port (24) of the cylinder head (30) by fixing means (40); a fuel supply line (80) for connecting the gas supply (62), the pressure controller (65) and the fuel rail (68); an electronic control unit (60) for outputting a control signal in order to inject a proper amount of the compressed natural gas into the engine (20) and electrically connected with the gas injectors (I1, I2, I3, I4), so that fast burning of the injected gas in the combustion chamber (22) is easily accomplished.

13 Claims, 9 Drawing Sheets

FIG. 5
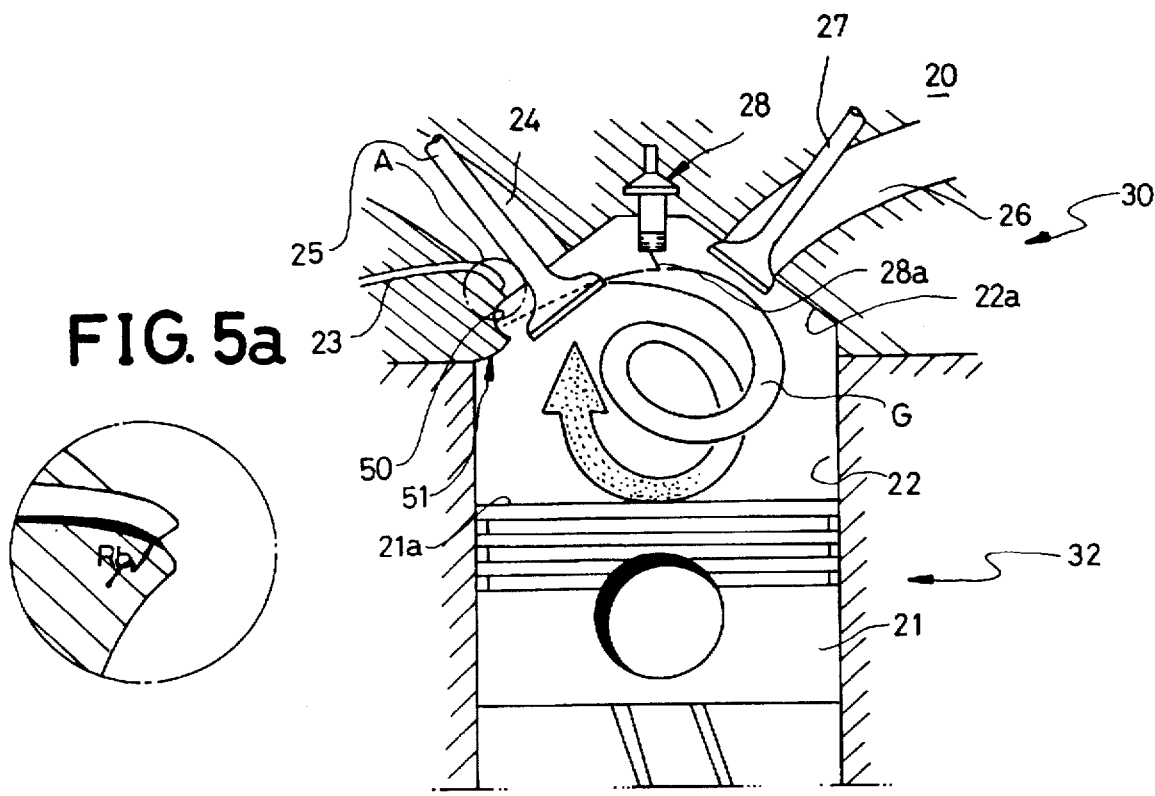
FIG. 5a
FIG. 6
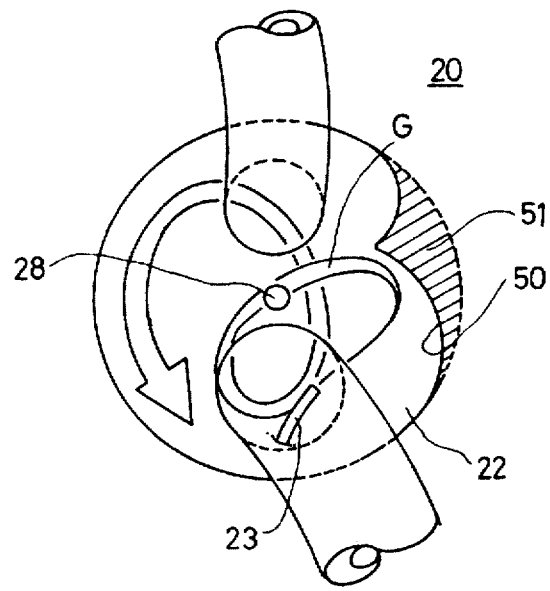

COMPRESSED NATURAL GAS ENGINE

TECHNICAL FIELD

The present invention relates to a natural gas flow generating apparatus and more particulary to a compressed natural gas flow generating apparatus in which swirl and tumble motions of the compressed natural gas injected in a combustion chamber by a gas injection tube connected to a gas injector are generated, thus increasing the volumetric efficiency and accomplishing fast burn in the engine.

BACKGROUND ART

In fuel injection systems of compressed natural gas engines, using high pressure gas stored in a gas tank, it is necessary to consider a structure in which pressure of gas can be properly maintained, and, since the gaseous fuel is injected to the engine, a volumetric efficiency is reduced as compared with a gasoline engine using liquid gasoline fuel and a slow burn is generated due to the characteristics of natural gas. Generally, in a natural gas engine, fuel burn is slowed down by 10%–20% as compared with that in a gasoline engine.

FIG. 1 is a longitudinal sectional view showing the structure of an intake port according to a conventional natural gas engine. FIG. 2 is a transverse sectional view of FIG. 1. As shown in FIGS. 1 and 2, an engine 10 includes a cylinder head 2 and a cylinder block 4 combined with a lower portion of the cylinder head 2. An intake port 14 of the cylinder head 2 is curved and a plurality of spiral grooves 13 is formed at the inner wall 14a of the intake port 14. The cylinder block 4 is made of a cast iron or an aluminum-base alloy.

The cylinder head 2 includes a spark plug 18, an intake valve 15, an exhaust valve 17.

The cylinder block 4 is combined with a lower portion of the cylinder head 2, so that a combustion chamber 12 is formed.

In the conventional natural gas engine 10, the inflow process of gas G toward a combustion chamber 12 is as follows.

As shown in FIG. 1, an intake valve 15 is open, an exhaust valve 17 is closed, and the compressed natural gas is injected to a combustion chamber 12 through a curved intake port 14 by a gas injector 19 mounted on the inner wall of an intake manifold 6. Thereafter, when hit against the inner wall 12a of the combustion chamber 12, the natural gas, is swirled or tumbled in the combustion chamber 12. Accordingly, fast burn of the natural gas is accomplished, so that the engine 10 is operated by the motion of a piston 11.

However, the conventional engine as mentioned above has several disadvantages of having to change the form of the intake port 14 to a curved-type, which requires a new casting to be made and making of which increases costs.

And, since the form of the intake port becomes very complicated in the state of full load, the flow of fuel is hindered by the form of the intake port, and therefore, the volumetric efficiency in the combustion chamber and the maximum output of the engine are decreased.

DISCLOSURE OF INVENTION

The object of the present invention is to provide a compressed natural gas flow generating apparatus which reduces or solves the above-noted problems.

Another object of the present invention is to provide a compressed natural gas flow generating apparatus which enables a fast burn and which increases an engine output forces.

These and other objects of the present invention are achieved by a preferred embodiment of compressed natural gas flow generating apparatus according to the present invention, the structure of which is as follows. The compressed natural gas engine comprises a cylinder head including an intake port, an exhaust port, a spark plug, and a gas injector, a cylinder block forming a combustion chamber together with the cylinder head, and a gas supply. Power is obtained by the burn of the spark plug in the combustion chamber. A compressed natural gas flow generating apparatus comprises one or more gas supply; a pressure controller for controlling the pressure of gas injected by the gas supply; a fuel rail for providing the gas controlled by the pressure controller to the combustion chamber, the fuel rail including a plurality of gas injectors for injecting gas and a plurality of gas injection tubes coupled with the gas injectors, the gas injection tube fixed to the end portion of the inner wall of the intake port of the cylinder head by fixing means. A fuel supply line connects the gas supply, the pressure controller and the fuel rail; and an electronic control unit outputs control signals in order to inject the proper amount of the compressed natural gas to the engine and which is electrically coupled with the gas injectors.

BRIEF DESCRIPTION OF THE DRAWINGS

For full understanding of the nature and objects of the present invention, reference to the following detailed description should be made in connection with the accompanying drawings wherein;

FIG. 5 is an outlined longitudinal sectional view showing the structure and mounting position of a second embodiment of a gas injection tube mounted to an intake port of a compressed natural gas flow generating apparatus of a compressed natural gas engine according to the present invention, FIG. 6 is a transverse sectional view of FIG. 5.

DETAILED DESCRIPTION OF THE INVENTION

Figure 1:
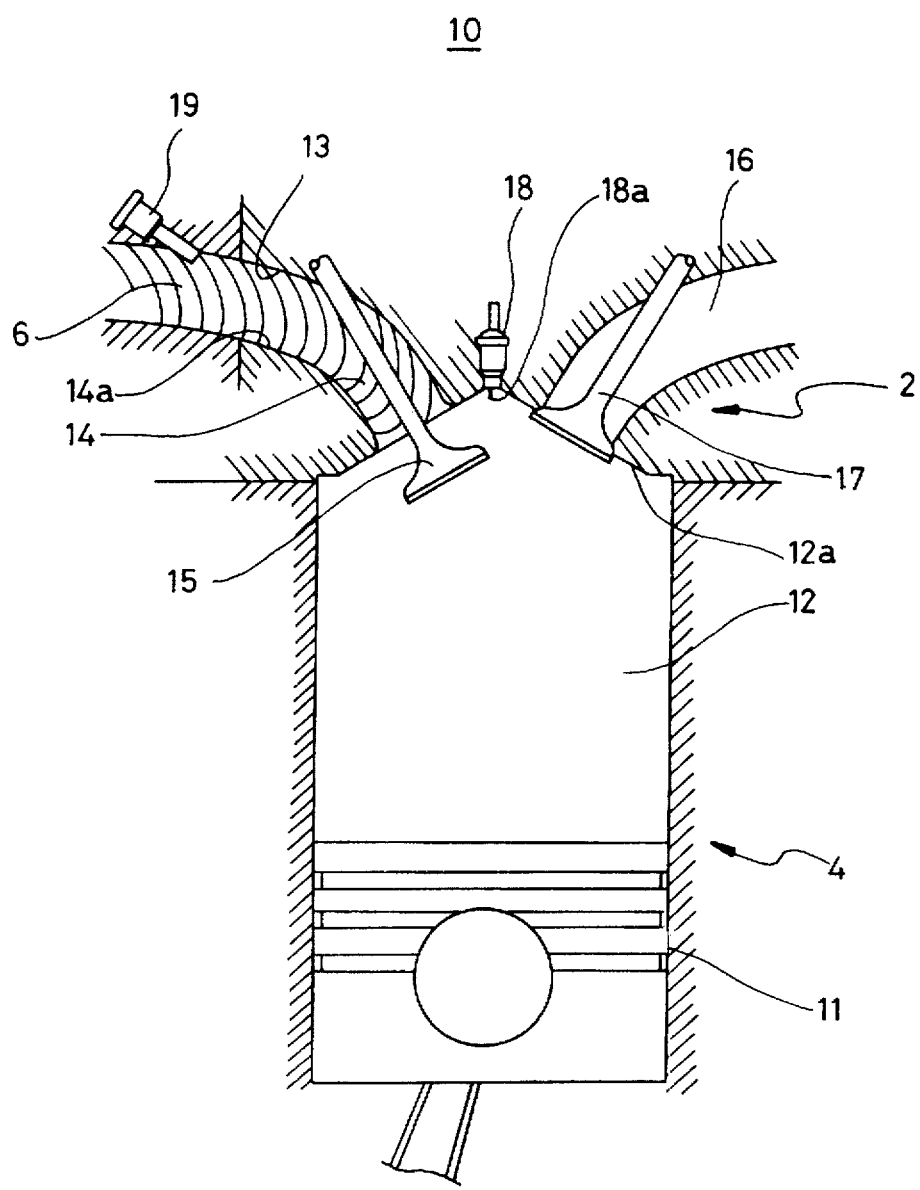
FIG. 1 is an outlined longitudinal sectional view showing the structure of an intake port of a compressed natural gas engine according to the prior conventional art.
Figure 2:
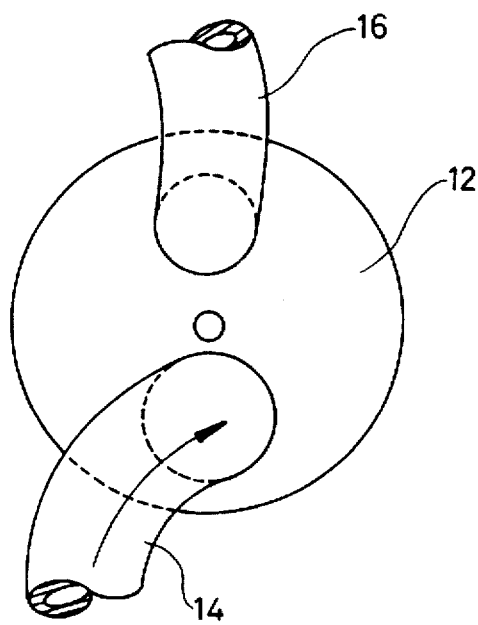
FIG. 2 is a transverse sectional view of FIG. 1.
Figure 3:
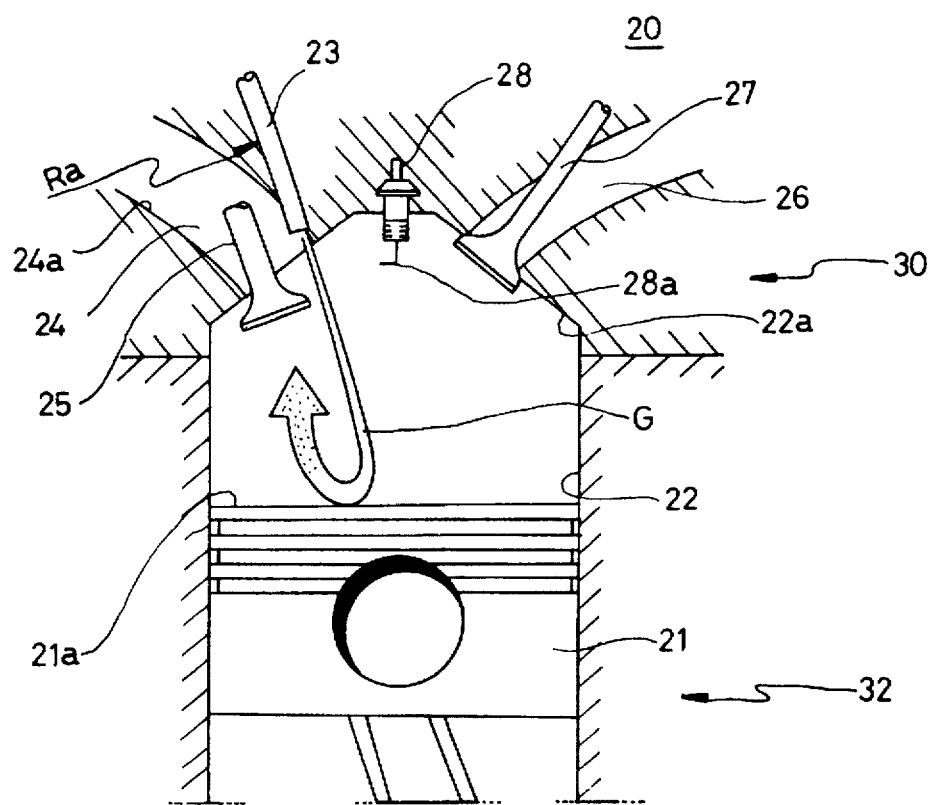
FIG. 3 is an outlined longitudinal sectional view showing the structure and mounting position of a first embodiment of a gas injection tube mounted to an intake port of a compressed natural gas flow generating apparatus of a compressed natural gas engine according to the present invention.
Figure 4:
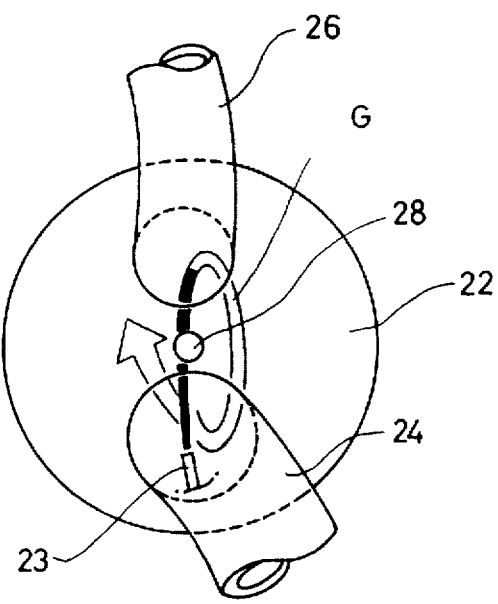
FIG. 4 is a transverse sectional view of FIG. 3.

Referring to FIGS. 3 and 4, the compressed natural gas engine 20 includes a cylinder head 30 and a cylinder block 32 combined to the lower portion of the cylinder head 30.

A piston 21 moves upwardly and downwardly in the combustion chamber 22 of the compressed natural gas engine 20.

An intake port 24 and an exhaust port 26 are formed at the predetermined position of the cylinder head 30, and a spark plug 28 having an electrode 28a is formed nearby the intake and exhaust ports 24 and 26. The intake and exhaust ports 24 and 26 are open and closed by intake and exhaust valves 25 and 27.

A gas injection tube 23 having a predetermined diameter is mounted to the cylinder head 30 by a fixing means 40 (see FIG. 8) and the one end of the gas injection tube 23 is slightly curved and protrudes at one side of the inner wall 24a of the intake port 24 which communicates with the combustion chamber 22. And the other end of the gas injection tube 23 communicates with a fuel rail 68 (see FIGS. 14 and 15).

The gas injection tube 23 has a predetermined radius of curvature Ra, and the gas G injected through the gas injection tube 23 hits at an acute angle against the upper surface 21a of the piston 21 and rebounds upwardly in a circle. That is, the gas G makes a tumbling motion in the combustion chamber 22. The structure and mounting position of gas injection tube 23 of the cylinder head 30, as mentioned above, is fit for a 4-valve engine.

Referring to FIGS. 5 and 6, the compressed natural gas engine 20 includes a cylinder head 30 and a cylinder block 32 combined to the lower portion of the cylinder head 30.

A piston 21 moves upwardly and downwardly in the combustion chamber 22 of the compressed natural gas engine 20.

An intake port 24 and an exhaust port 26 are formed at the predetermined position of the cylinder head 30, and a spark plug 28 having an electrode 28a is formed nearby the intake and exhaust ports 24 and 26. The intake and exhaust ports 24 and 26 are open and closed by intake and exhaust valves 25 and 27.

A gas injection tube 23 having a predetermined diameter is mounted to the cylinder head 30 by a fixing means 40 (see FIG. 8) and the one end of the gas injection tube 23 is slightly curved and protrudes at one side of the inner wall 24a of the intake port 24 which communicates with the combustion chamber 22. And the other end of the gas injection tube 23 communicates with a fuel rail 68 (see FIGS. 14 and 15).

In this embodiment, the end portion of the gas injection tube 23 has a predetermined radius of curvature Rb.

A flow generating head mask 51 having a concavity 50 protrudes into one side of the inner wall 22a of the cylinder head 30. The gas injected through the gas injection tube 23 is guided to an electrode 28a of the spark plug 28 hitting the flow generating head mask 51 which produces a swirling motion in the combustion chamber 22.

The concavity 50 of the flow generating head mask 51 has a side section shaped in a circular arc.

The structure and mounting position of the gas injection tube of the cylinder head, as mentioned above, is fit for a 2-valve engine.

Figure 7:
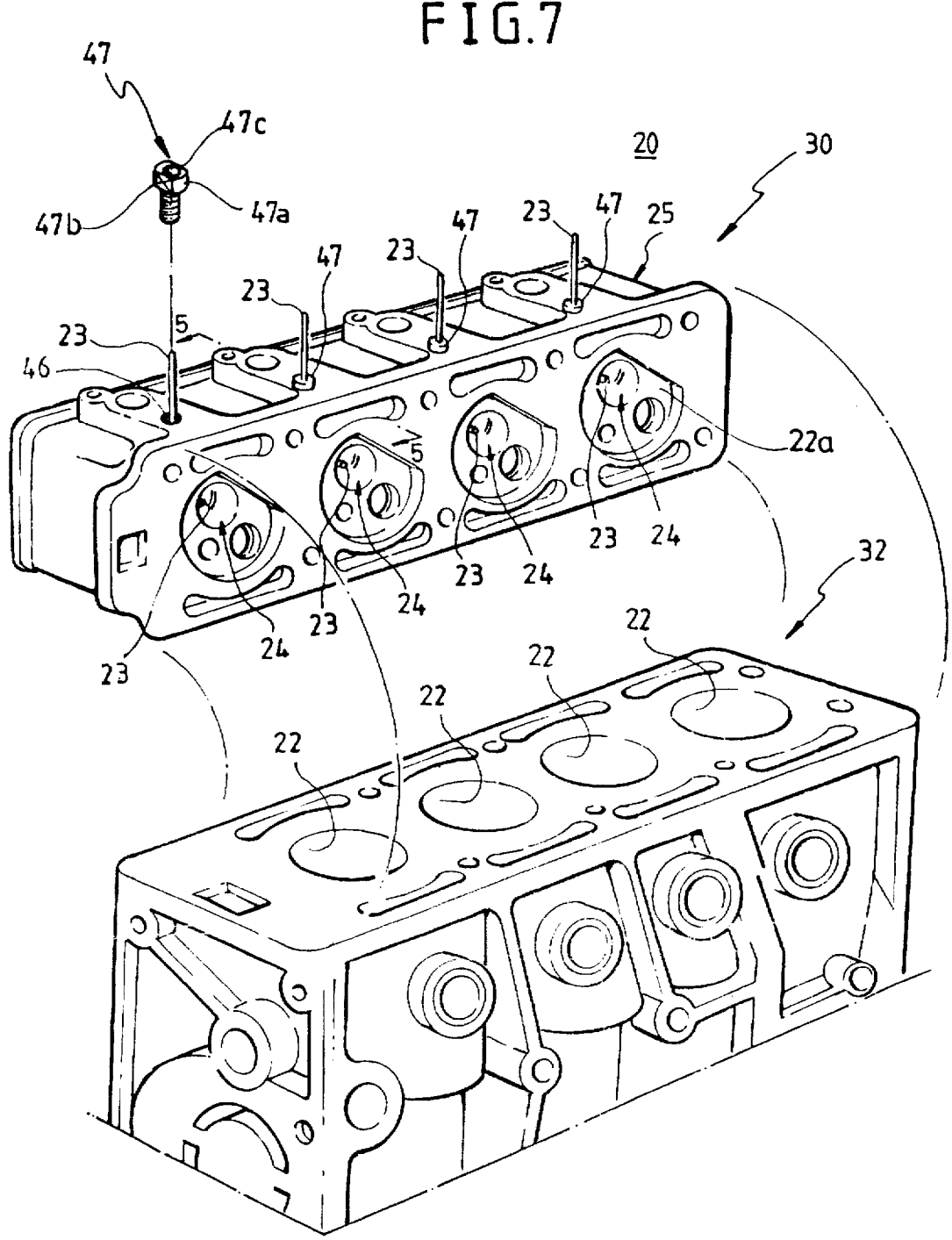
FIG. 7 is a perspective view of a cylinder head and a cylinder block of a compressed natural gas flow generating apparatus of a compressed natural gas engine according to the present invention.

Referring to FIG. 7, the engine 20 according to the present invention comprises a cylinder block 32 including a combustion chamber 22 and a cylinder head 30 including an intake port 24, an exhaust port 26, a spark plug 28, and a gas injection tube 23.

The gas injection tube 23 is inserted to and fixed within a hole of a bolt 47, and the bolt 47 is combined to a hole 46 of the cylinder head 30.

Figure 8:
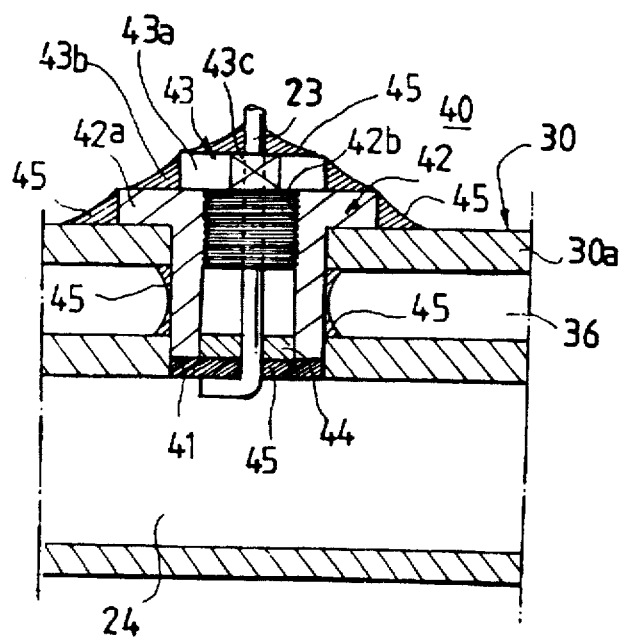
FIG. 8 is a partial side sectional view of first embodiment showing the fixing means for mounting a gas injetion tube to an intake port of a compressed natural gas engine according to the present invention.

Referring to FIG. 8, means for fixing a gas injection tube is as follows: in the fixing means 40, a penetration hole 41 is formed from outer wall 30a of the cylinder head 30 of the compressed natural gas engine 20 to an intake port 24 through a cooling water passage 36. The hole 41 is closed by a bush 42 having a flange 42a and a hole 42b, and the upper portion of the bush 42 is welded to the upper portion of an outer wall 30a of the cyliner head 30. The hole 42b of the bush 42 is combined with a bolt 43 to which a gas injection tube 23 is inserted and fixed. The lower opening of the hole 42b is closed by a ring-type spacer 44. The upper, lower and side portions of the bush 42 is sealed by a sealer 45 in order to prevent leakage of the natural gas.

Two working surfaces 43c are formed at the outer portion of the head 43a of the bolt 43 in order to catch the bolt with an implement such as a wrench.

Figure 9:
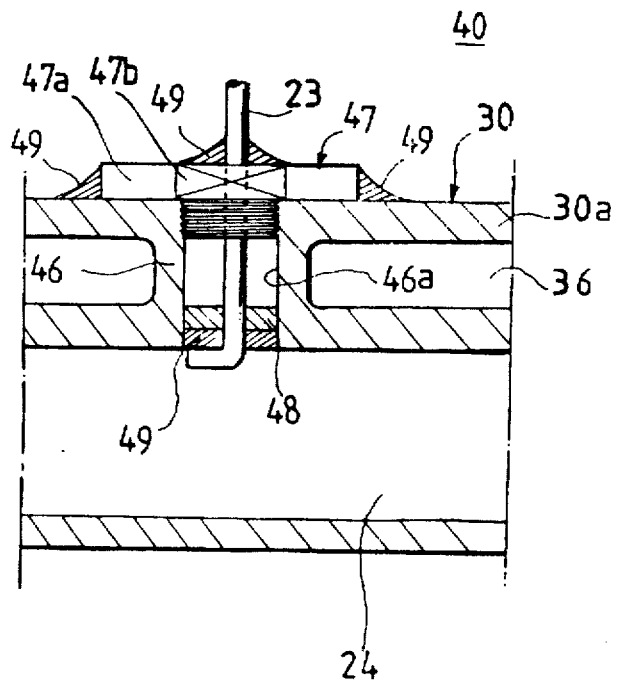
FIG. 9 is a partial side sectional view of another embodiment showing the fixing means for mounting a gas injection tube to an intake port of a compressed natural gas engine according to the present invention.

Referring to FIG. 9, means for fixing a gas injection tube 23 showing another embodiment is as follows: in the fixing means 40, the cylinder head 30 includes a tube insertion pipe 46 having a hole 46a. The hole 46a is formed from the outer wall 30a of the cylinder head 30 to the intake port 24 through a cooling water passage 36 and is combined with a bolt 47 inserted to and fixed within a gas injection tube 23. And the upper portion of the bolt 47 is welded. The lower portion of the bolt 47 is closed by a ring-type spacer 48. The upper, lower and side portions of the bolt 47 is sealed by a sealer 49 in order to prevent leakage of the natural gas.

Two working surfaces 47b are formed at the outer portion of the head 47a of the bolt 47 in order to catch the bolt with an implement such as a wrench.

In fixing means 40 of the above two embodiments, the material of the sealers 45 and 49 is an adhesive, and any adhesive having strong adhesive force may be used.

The bolt 47 may be fixed to the cylinder head 30 by other fixing method such as welding, inserting and fixing, combining by adhesives.

Figure 10:
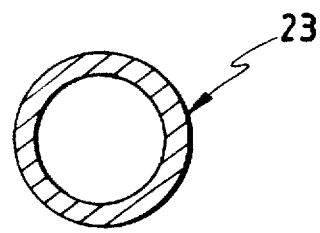
FIG. 10 is a transverse sectional view of first embodiment of a gas injection tube according to the present invention.
Figure 11:
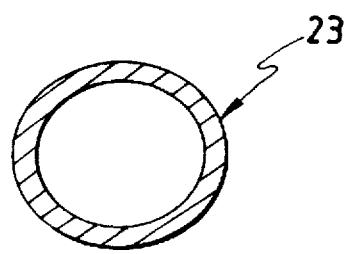
FIG. 11 is a transverse sectional view of another embodiment of a gas injection tube according to the present invention.
Figure 12:
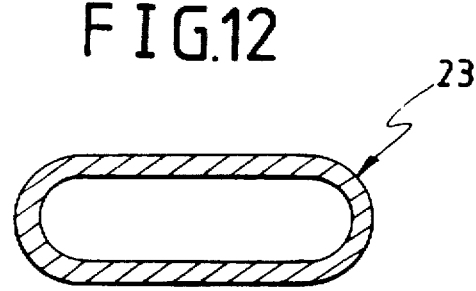
FIG. 12 is a transverse sectional view of another embodiment of a gas injection tube according to the present invention.
Figure 13:
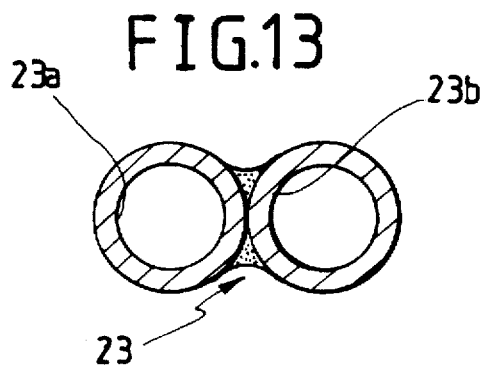
FIG. 13 is a transverse sectional view of another embodiment of a gas injection tube according to the present invention.

Referring to FIGS. 10 to 13, the gas injection tube 23 has various sectional shapes. In FIG. 10, the sectional shape of the gas injection tube 23 is circular, in FIG. 11, it is elliptical, and in FIG. 12, it is long oval. And, in FIG. 13, the gas injection tube 23 has two holes 23a and 23b, thus making two streams of the injected gas G.

Figure 14:
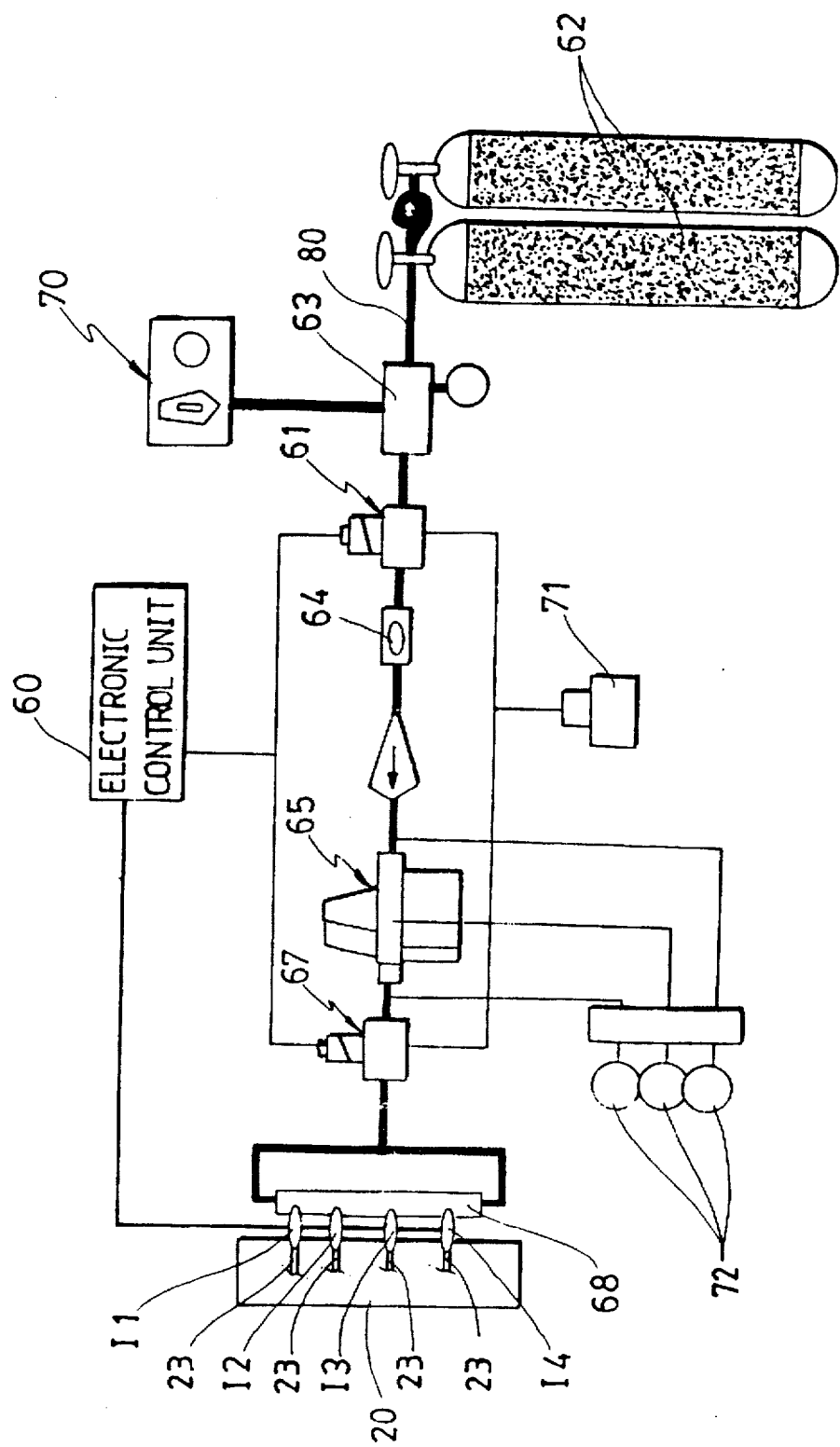
FIG. 14 is an outlined view of a fuel injection system of a compressed natural gas engine according to the present invention.

Referring to FIG. 14, the compressed natural gas flow generating apparatus of a compressed natural gas engine according to the present invention comprises one or more gas supply tanks 62—in this drawing, two gas tanks connected with each other—containing, in general, compressed natural gas of pressure of about 200 Kg/Cm$^2$; a fuel distributor 63 coupled with the gas supply 62; a high pressure fuel cutoff valve 61, as a safety apparatus, coupled with the fuel distributor 63; a low pressure fuel cutoff valve 67 coupled with the high pressure fuel cutoff valve 61; a gas filter 64 positioned between the high and low pressure fuel cutoff valves 61 and 67 and for filtering impurities in fuel; a pressure controller 65 for controlling the pressure of the inflow gas of the gas supply 62; a fuel rail 68, as a surge tank, connected to the output port of the low pressure fuel cutoff valve 67, the fuel rail 68 including a plurality of gas injectors I1,I2,I3 and I4 and a plurality of gas injection tubes 23 having a predetermined diameter each one being coupled to one of the gas injectors I1,I2,I3 and I4.

The high and low pressure fuel cutoff valves 61 and 67, and the gas injectors I1,I2,I3 and I4 are electrically connected with the electronic control unit 60.

The high pressure fuel cutoff valve 61 is operated at a pressure of about 200 Kg/Cm$^2$ and at a voltage of 12 V.

And the valve 61 is a solenoid valve having fast response velocity.

The low pressure fuel cutoff vavle 67 is also a solenoid valve which can be operated at pressure lower than 10 Kg/Cm$^2$ and plays the role of a safety device together with the high pressure cutoff valve 61.

The gas injectors I1,I2,I3 and I4 are devices which inject the proper amount of gas to the engine 20.

The electronic control unit 60 is a device which outputs control signal in order to operate the engine 20.

And, the gas supply 62, the fuel distributor 63, the gas filter 64, the pressure controller 65, the fuel rail 68 and the high and low pressure cutoff valves 61 and 67 are coupled one another by a fuel supply line 80.

The pressure controller 65 controls the pressure of gas in two steps (that is, 200 Kg/Cm$^2$–20 Kg/Cm$^2$–6 Kg/Cm$^2$).

The engine 20 is configured to operate at a high pressure ratio.

The reference numeral 70 is a fuel filling device for filling gas to the gas supply 62 from a compressor (not shown) and includes a relief valve (not shown) for preventing back flow of gas.

The reference numeral 71 is a manually operated ball-type fuel cutoff valve mounted in a car. The reference numeral 72 is a pressure gauge coupled to the input port, the output port and the pressure chamber of the pressure controller 65 and shows three types of pressure; high, medium and low.

The operation and the effects of the compressed natural gas flow generating apparatus according to the present invention are as follows:

An electronic control unit 60 outputs control signal when the ignition switch (not-shown) is turned on, and high and low pressure fuel cutoff valves 61 and 67 are open by the control signal. The compressed natural gas of a pressure of about 200 Kg/Cm$^2$ is ejected from the gas supply 62, and the ejected gas, after passing through a fuel distributor 63 and a high pressure fuel cutoff valve 61, is filtered by a gas filter 64. The gas pressure of is controlled to about 5–6 Kg/Cm$^2$ by a pressure controller 65, and then the gas flows to a fuel rail 68 through a low pressure fuel cutoff valve 67. The electronic control unit 60 controls gas injectors I1,I2,I3 and I4 mounted to the fuel rail 60. Since the gas injector I1,I2,I3 and I4 are coupled with the gas injection tube 23 in the fuel rail 68, the gas is injected to the engine 20 by each gas injection tube 23. When the gas is injected to the combustion chamber 22 of the engine 20 by the gas injection tube 23, since the pressure of the injected gas is higher than the atmospheric pressure, the injection velocity of the gas becomes very high and the gas is burned in the combustion chamber 22 of the engine 20 and then the engine 20 is operated by the power.

When the compressed natural gas engine 20 is a 4-valve type as shown in FIGS. 3 and 4, the gas G injected by the gas injection tube 23 hits at an acute angle against the upper portion 21a of a piston 21 which moves upwardly and downwardly in the combustion chamber 22, and fills the combustion chamber 22 at very high velocity. Since the size of the sectional shape of the gas injection tube 23 is very small, the injected gas makes a stream of constant thickness and a tumbling motion. Thereafter, the fast burn of the injected gas G filled in the combustion chamber is easily accomplished by ignition of the spark plug 28.

When the compressed natural gas engine 20 is a 2-valve type as shown in FIGS. 5 and 6, the gas G injected by the gas injection tube 23 is hit against the concavity 50 of the flow generating head mask 51 and is guided toward an electrode 28a of the spark plug 28 by the concavity 50 and filled in a combustion chamber 22. Since the size of the sectional shape of the gas injection tube is very small, the injected gas makes a stream of constant thickness and swirling motion. Thereafter, the fast burn of the injected gas G filled in the combustion chamber is easily accomplished by ignition of the spark plug 28.

Figure 15:
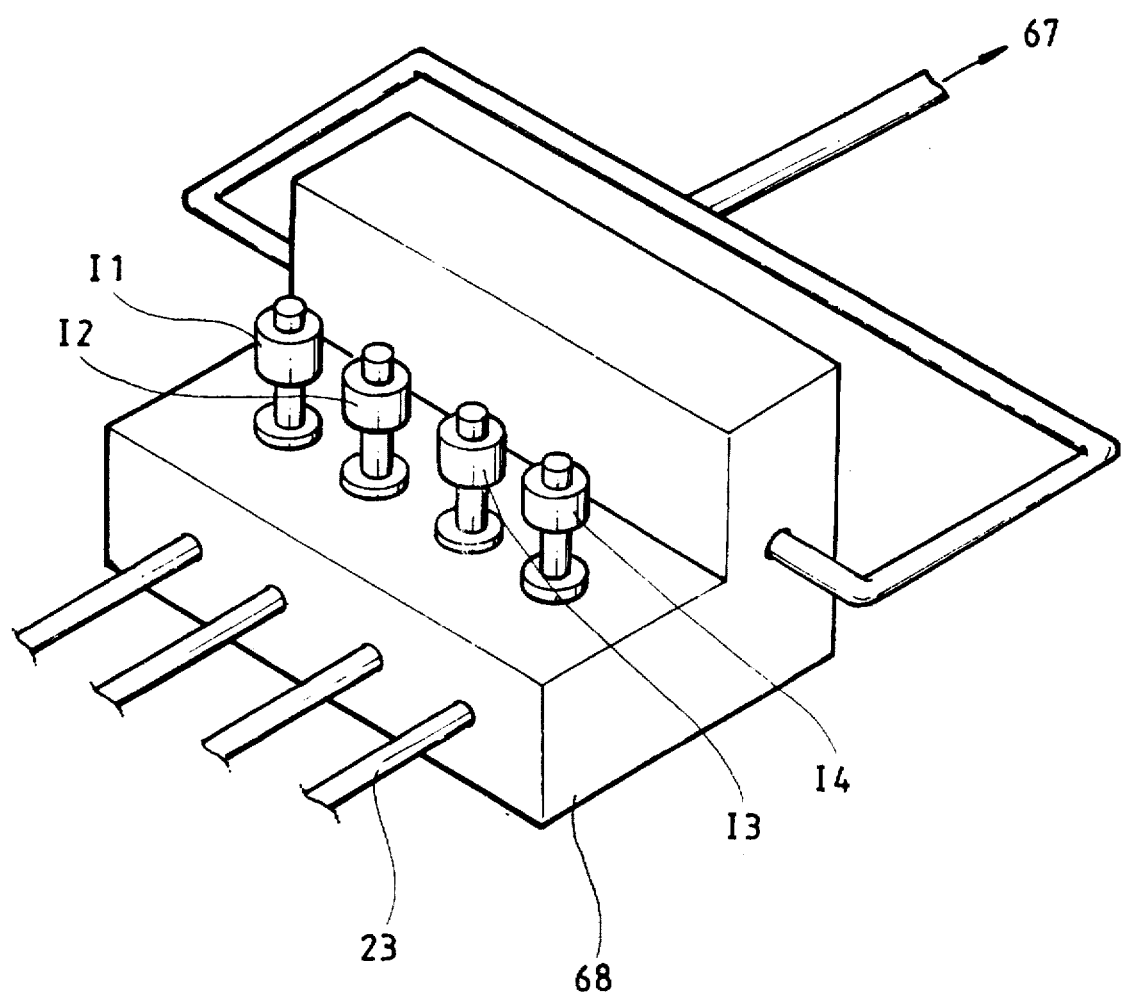
FIG. 15 is a perspective view showing a fuel rail of FIG. 14.

Referring to FIG. 15, a fuel rail 68 includes a plurality of gas injectors I1,I2,I3 and I4 and gas injecton tubes 23 each coupled with a respective gas injector. One end of the fuel rail 68 is coupled to a low pressure fuel cutoff valve 67.

And, the gas injection tube 23 of the present invention is desirably mounted to one end portion of the intake port 24 of the engine 20, i.e. nearby the combustion chamber 22.

As mentioned above, the present invention has several effects of reducing the manufacturing cost and simplifying the manufacturing process by not requiring a casting to make a curved intake port of the cylinder head and also of increasing the volumetric efficiency of the engine and the maximum output by fast filling of the gas in the combustion chamber and guiding it to the electrode of the spark plug.

What is claimed is:

1. A compressed natural gas engine comprising:
   a cylinder head and cylinder block in which a piston reciprocates forming a combustion chamber,
   said cylinder head having an intake port for receiving gas from an injector supplied to the chamber through a gas injection tube fixed to one part of the intake port, an exhaust port and a spark plug, power being obtained by the burn of the gas in the combustion chamber ignited by said spark plug;
   a flow generating head mask having a concavity guiding the gas injected through the gas injection tube to the spark plug, the flow generating head mask protrudently formed at one side of the inner wall of the cylinder head.

2. A compressed natural gas flow generating apparatus according to claim 1, wherein the side section of the concavity of the flow generating head mask is shaped in a circular arc, and the gas injected through the gas injection tube is guided to an electrode of the spark plug by the flow generating head mask and swirled in the combustion chamber.

3. A compressed natural gas engine according to claim 1 wherein said injecting tube is fixed to the intake port by fixing means comprising a penetration hole formed from the outer wall of the cylinder head to the intake port through a cooling water passage, a bush having a flange and a hole for closing the penetration hole, a bolt receiving the gas injection tube and combined with the hole of said bush, a spacer for sealing the lower portion of the hole, and a sealer for sealing the upper, lower and side portions of the bush in order to prevent leakage of the natural gas.

4. A compressed natural gas engine according to claim 1, wherein said injecting tube is fixed to said intake port by fixing means comprising a tube insertion pipe having a hole, the hole formed from the outer wall of the cylinder head to the intake port through a cooling water passage, a bolt receiving the gas injection tube and combined with the hole, a spacer for sealing the lower portion of the bolt, and a sealer for sealing the upper, lower and side portions of the bolt in order to prevent leakage of the natural gas.

5. A compressed natural gas engine as in claim 1 further comprising:
   at least one gas supply;
   a pressure controller for controlling the pressure of gas injected by the gas supply;
   a fuel rail for providing gas from said pressure controller, the fuel rail including a plurality of gas injectors injecting gas and a plurality of gas injection tubes coupled with the gas injectors, the gas injection tubes fixed to one end of the inner wall of the intake port of the cylinder head by fixing means;
   a fuel supply line for coupling the gas supply, the pressure controller and the fuel rail; and
   an electronic control unit for outputting control signal in order to inject proper amount of the compressed natural gas to the engine and electrically connected with the gas injectors.

6. A compressed natural gas flow generating apparatus according to claim 1, wherein the sectional shape of the gas injection tube is circular.

7. A compressed natural gas flow generating apparatus according to claim 1, wherein the sectional shape of the gas injection tube is elliptical.

8. A compressed natural gas flow generating apparatus according to claim 1, wherein the sectional shape of the gas injection tube is long oval.

9. A compressed natural gas flow generating apparatus according to claim 1, wherein the gas injection tube has two holes.

10. A compressed natural gas engine comprising:
    a cylinder head and cylinder block in which a piston reciprocates forming a combustion chamber,
    said cylinder head having an intake port for receiving gas from an injector supplied to the chamber through a gas injection tube fixed to one part of the intake port, an exhaust port and a spark plug, power being obtained by the burn of the gas in the combustion chamber ignited by said spark plug;
    wherein said injecting tube is fixed to the intake port by fixing means comprising a penetration hole formed from the outer wall of the cylinder head to the intake port through a cooling water passage, a bush having a flange and a hole for closing the penetration hole, a bolt receiving the gas injection tube and combined with the hole of said bush, a spacer for sealing the lower portion of the hole, and a sealer for sealing the upper, lower and side portions of the bush in order to prevent leakage of the natural gas.

11. A compressed natural gas engine comprising:
    a cylinder head and cylinder block in which a piston reciprocates forming a combustion chamber,
    said cylinder head having an intake port for receiving gas from an injector supplied to the chamber through a gas injection tube fixed to one part of the intake port, an exhaust port and a spark plug, power being obtained by the burn of the gas in the combustion chamber ignited by said spark plug;
    wherein said injecting tube is fixed to said intake port by fixing means comprising a tube insertion pipe having a hole, the hole formed from the outer wall of the cylinder head to the intake port through a cooling water passage, a bolt receiving the gas injection tube and combined with the hole, a spacer for sealing the lower portion of the bolt, and a sealer for sealing the upper, lower and side portions of the bolt in order to prevent leakage of the natural gas.

12. A compressed natural gas engine comprising:
    a cylinder head and cylinder block in which a piston reciprocates forming a combustion chamber,
    said cylinder head having an intake port for receiving gas from an injector supplied to the chamber through a gas injection tube fixed to one part of the intake port, an exhaust port and a spark plug, power being obtained by the burn of the gas in the combustion chamber ignited by said spark plug;
    wherein said injecting tube is fixed to the intake port by fixing means comprising a penetration hole formed from the outer wall of the cylinder head to the intake port through a cooling water passage, a bush having a flange and a hole for closing the penetration hole, a bolt receiving the gas injection tube and combined with the hole of said bush, a spacer for sealing the lower portion of the hole, and a sealer for sealing the upper, lower and side portions of the bush in order to prevent leakage of the natural gas;
    said gas injection tube having a predetermined radius of curvature, Ra, so that the gas injected by the gas injection tube is hit at an acute angle against the upper surface of the piston and tumbled in the combustion chamber.

13. A compressed natural gas engine comprising:
    a cylinder head and cylinder block in which a piston reciprocates forming a combustion chamber,
    said cylinder head having an intake port for receiving gas from an injector supplied to the chamber through a gas injection tube fixed to one part of the intake port, an exhaust port and a spark plug, power being obtained by the burn of the gas in the combustion chamber ignited by said spark plug;
    wherein said injecting tube is fixed to said intake port by fixing means comprising a tube insertion pipe having a hole, the hole formed from the outer wall of the cylinder head to the intake port through a cooling water passage, a bolt receiving the gas injection tube and combined with the hole, a spacer for sealing the lower portion of the bolt, and a sealer for sealing the upper, lower and side portions of the bolt in order to prevent leakage of the natural gas;
    said gas injection tube having a predetermined radius of curvature, Ra, so that the gas injected by the gas injection tube is hit at an acute angle against the upper surface of the piston and tumbled in the combustion chamber.

* * * * *